United States Patent [19]
Otsubo et al.

[11] Patent Number: 5,679,092
[45] Date of Patent: Oct. 21, 1997

[54] GEAR-SHIFT CONTROL SYSTEM OF AUTOMATIC TRANSMISSION FOR MOTOR VEHICLE

[75] Inventors: Hideaki Otsubo, Susono; Yasunori Nakawaki, Aichi-ken, both of Japan

[73] Assignee: Toyota Jidosha Kabushiki Kaisha, Toyota, Japan

[21] Appl. No.: 538,991

[22] Filed: Oct. 5, 1995

[30] Foreign Application Priority Data

Oct. 21, 1994 [JP] Japan ................................. 6-256375

[51] Int. Cl.$^6$ ................ F16H 61/00; F16H 61/16; F16H 59/66
[52] U.S. Cl. .................... 477/97; 180/197; 364/426.03
[58] Field of Search ........................... 477/97; 180/197; 364/426.03, 426.02

[56] References Cited

U.S. PATENT DOCUMENTS

| | | | |
|---|---|---|---|
| 5,047,940 | 9/1991 | Onaka et al. | 364/426.02 |
| 5,103,398 | 4/1992 | Akiyama | 364/426.03 X |
| 5,262,952 | 11/1993 | Tsuyama et al. | 364/426.03 |
| 5,383,125 | 1/1995 | Hibi | 180/197 X |
| 5,390,116 | 2/1995 | Hayafure | 180/197 X |

FOREIGN PATENT DOCUMENTS

| | | |
|---|---|---|
| 60-215434 | 10/1985 | Japan. |
| 1-238747 | 9/1989 | Japan. |
| 2-144233 | 6/1990 | Japan. |

*Primary Examiner*—Rodney H. Bonck
*Assistant Examiner*—Saul J. Rodriguez
*Attorney, Agent, or Firm*—Oblon, Spivak, McClelland, Maier & Neustadt, P.C.

[57] ABSTRACT

A gear-shift control system of an automatic transmission, in which gear shift schedule is appropriately changed-over in correspondence with the change of a road surface situation. Low-friction road surface detection device detects a low-friction road surface so as to select the gear shift schedule for the low-friction road surface adopted to start the motor vehicle with second gear. After the selection, a holding device holds the gear shift schedule for the low-friction road surface until an accelerator is pressed next.

1 Claim, 7 Drawing Sheets

| SHIFT POSITION | | $C_1$ | $C_2$ | $C_0$ | $B_1$ | $B_2$ | $B_3$ | $B_0$ | $F_1$ | $F_2$ | $F_0$ |
|---|---|---|---|---|---|---|---|---|---|---|---|
| P | | | | ○ | | | | | | | |
| R | | | ○ | ○ | | | ○ | | | | |
| N | | | | ○ | | | | | | | |
| D | 1 | ○ | | ○ | | | | | | ◎ | ◎ |
| D | 2 | ○ | | ○ | | ○ | | | ◎ | | ◎ |
| D | 3 | ○ | ○ | ○ | | ○ | | | | | ◎ |
| D | 4 | ○ | ○ | | | ○ | | ○ | | | |
| 2 | 1 | ○ | | ○ | | | | | | ◎ | ◎ |
| 2 | 2 | ○ | | ○ | ○ | ○ | | | ◎ | | ◎ |
| 2 | 3 | ○ | ○ | ○ | | ○ | | | | | ◎ |
| L | 1 | ○ | | ○ | | ○ | | | | ◎ | ◎ |
| L | 2 | ○ | | ○ | ○ | ○ | | | ◎ | | ◎ |

MARK ◎ : ACTUATED WHEN DRIVING ONLY.

GEAR-SHIFT CONTROL SYSTEM OF AUTOMATIC TRANSMISSION FOR MOTOR VEHICLE

BACKGROUND OF THE INVENTION

1. Field of the Invention

The present invention relates to an automatic transmission for a motor vehicle. More particularly, it relates to that gear-shift control system of an automatic transmission in which gear shift schedule for a low-friction road surface adapted to start a motor vehicle at a high-speed gear stage and gear shift schedule for a high-friction road surface adapted to start the motor vehicle at a low-speed gear stage are automatically changed in accordance with a road surface condition.

2. Description of the Prior Art

A snow-covered road or an icy road has a road surface which exhibits a small friction coefficient, and which is slippery. In such a situation, when a motor vehicle is started with the first gear (at the lowest-speed gear stage) of a transmission, the driving torques of driving wheels become great relatively to the grip forces of tires for the road surface. Therefore, the driving wheels slip, and the motor vehicle is difficult to start favorably.

The official gazette of Japanese Patent Application Laid-open No. 144233/1990 discloses that gear-shift control system of a transmission which detects whether the running road surface of a motor vehicle is a low-friction road surface or a high-friction road surface, and in which, subject to the low-friction road surface, a gear shift is effected in conformity with gear shift schedule for the low-friction road surface adapted to start the motor vehicle with the second gear (at the second-speed gear stage) of the transmission, whereas subject to the high-friction road surface, it is effected in conformity with gear shift schedule for the high-friction road surface adapted to start the motor vehicle with the first gear of the transmission.

With the known system, however, the detected result of the low-friction road surface is canceled after the lapse of a preset time period. Therefore, with the cancel of the detected result, the gear shift schedule for the low-friction road surface is changed over to the gear shift schedule for the high-friction road surface. This has posed the problem that the start with the first gear could occur in spite of the low-friction road surface, or that a shift shock could appear due to a (second gear→first gear) downshift based on the changeover between both the gear shift schedule, accordingly, a control for the schedule changeover fails to appropriately proceed in some cases.

SUMMARY OF THE INVENTION

The present invention has been made in order to solve the problem of the prior art as stated above, and has for its object to provide that gear-shift control system of an automatic transmission for a motor vehicle in which both gear-shift schedule can be appropriately changed-over in correspondence with the change of a road surface situation or the driver's operation of pressing an accelerator pedal.

Incidentally, the expression "power ON state" shall signify the vehicle-driving state in which power is being transmitted from an engine side to a wheel side with an accelerator pedal pressed or stepped on, and the expression "power OFF state" the vehicle-driven state in which power is being transmitted from the wheel side to the engine side with the accelerator pedal released or eased up. As is well known, the press of the accelerator pedal does not exactly agree with the driving state of the motor vehicle, and the release of the accelerator pedal does not exactly agree with the driven state of the motor vehicle, either. However, irrespective of whether practicable examples take note of only the press/release of the accelerator pedal, or of only the driving/driven state of the motor vehicle, they shall fall under the category of the technical ideas of the present invention.

According to the present invention, after the low-friction road surface is detected and the gear shift schedule for the low-friction road surface is selected, the gear shift schedule for the low-friction road surface is held until the next press of the accelerator pedal is detected. In this regard, a case is considered where the low-friction road surface is not (cannot be) thereafter detected as such due to, for example, the driver's operation of releasing the accelerator pedal. However, once the gear shift schedule for the low-friction road surface has been selected, it is held even when the above case continues for long. Therefore, the start of the motor vehicle at the high-speed gear stage (with the second gear), etc. can be reliably effected. Moreover, after the accelerator pedal has been pressed next, a new road-surface condition can be detected so that the gear shift schedule is selected on the basis of the detection of the new road-surface condition. Therefore, the gear shift schedule can be changed-over in correspondence with the change of the running road-surface situation of the motor vehicle.

According to the present invention, while the gear shift schedule for the low-friction road surface is selected, the changeover thereof to the gear shift schedule for the high-friction road surface is inhibited in the power ON state, and it is allowed only in the power OFF state.

Accordingly, it is possible to prevent the downshift due to the changeover (for low-friction→for high-friction) in the power ON state from occurring, and possible to avoid the appearance of an unexpected shift shock.

By the way, it is possible to carry out both of the above technique at the same time. In this case, the automatic transmission is controlled as follows. That is, the gear shift schedule for the low-friction road surface is held till the next press of the accelerator pedal. Even if the high-friction road surface is detected at the next press of the accelerator pedal, the changeover to the gear shift schedule for the high-friction road surface is inhibited throughout the press of the accelerator pedal (throughout the power ON state), namely, the changeover is not effected immediately, but is effected after a wait of the re-release of the accelerator pedal.

Incidentally, the changeover of the gear shift schedule from those for the high-friction road surface to those for the low-friction road surface is effected immediately upon the detection of the low-friction road surface in order to quickly relieve difficulty in the driver's operation of the accelerator pedal.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENT

Now, an embodiment of the present invention will be described in detail with reference to the drawings.

Figure 1A:
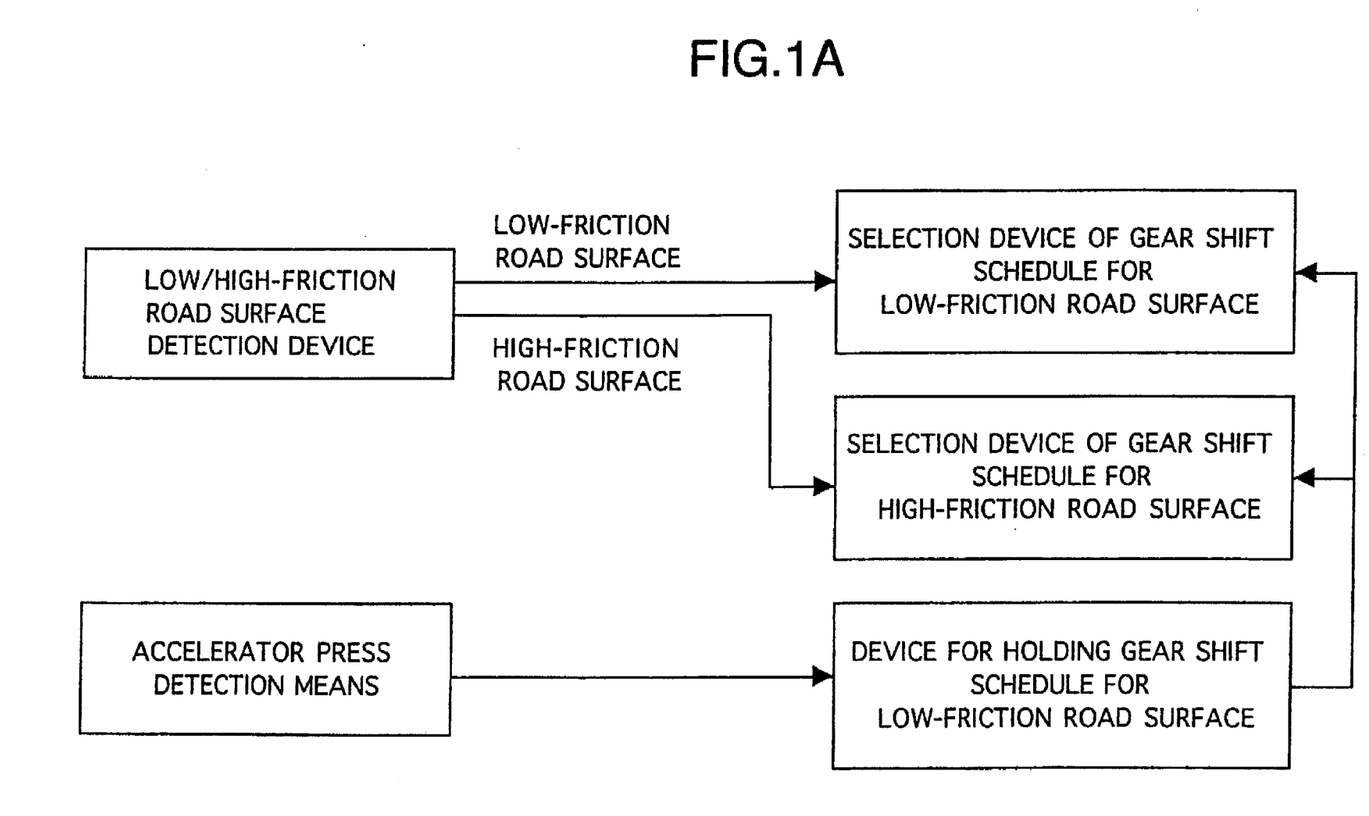
FIGS. 1A, 1B and 1C are block diagrams each showing the purport of the present invention.
Figure 1B:
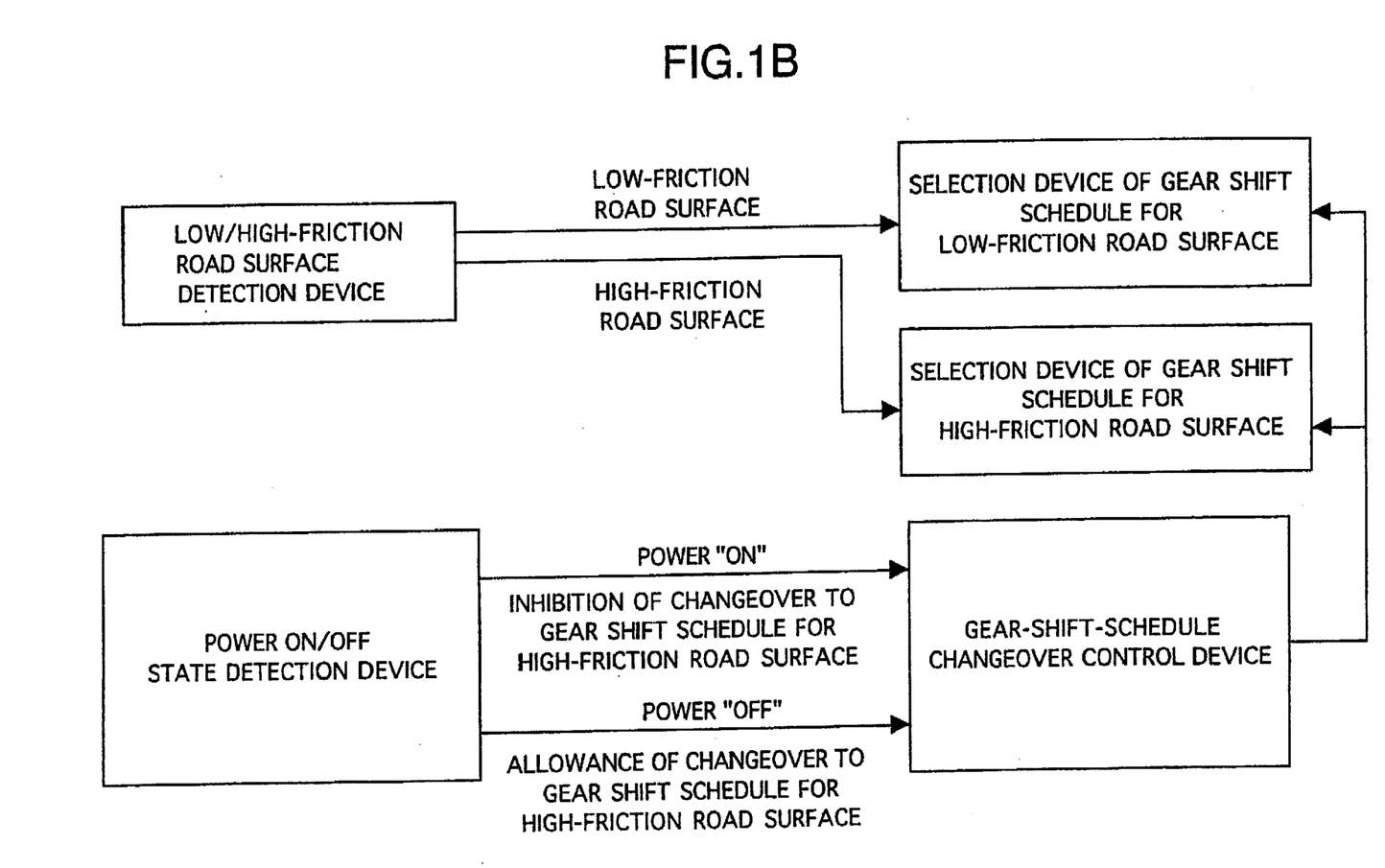
Figure 1C:
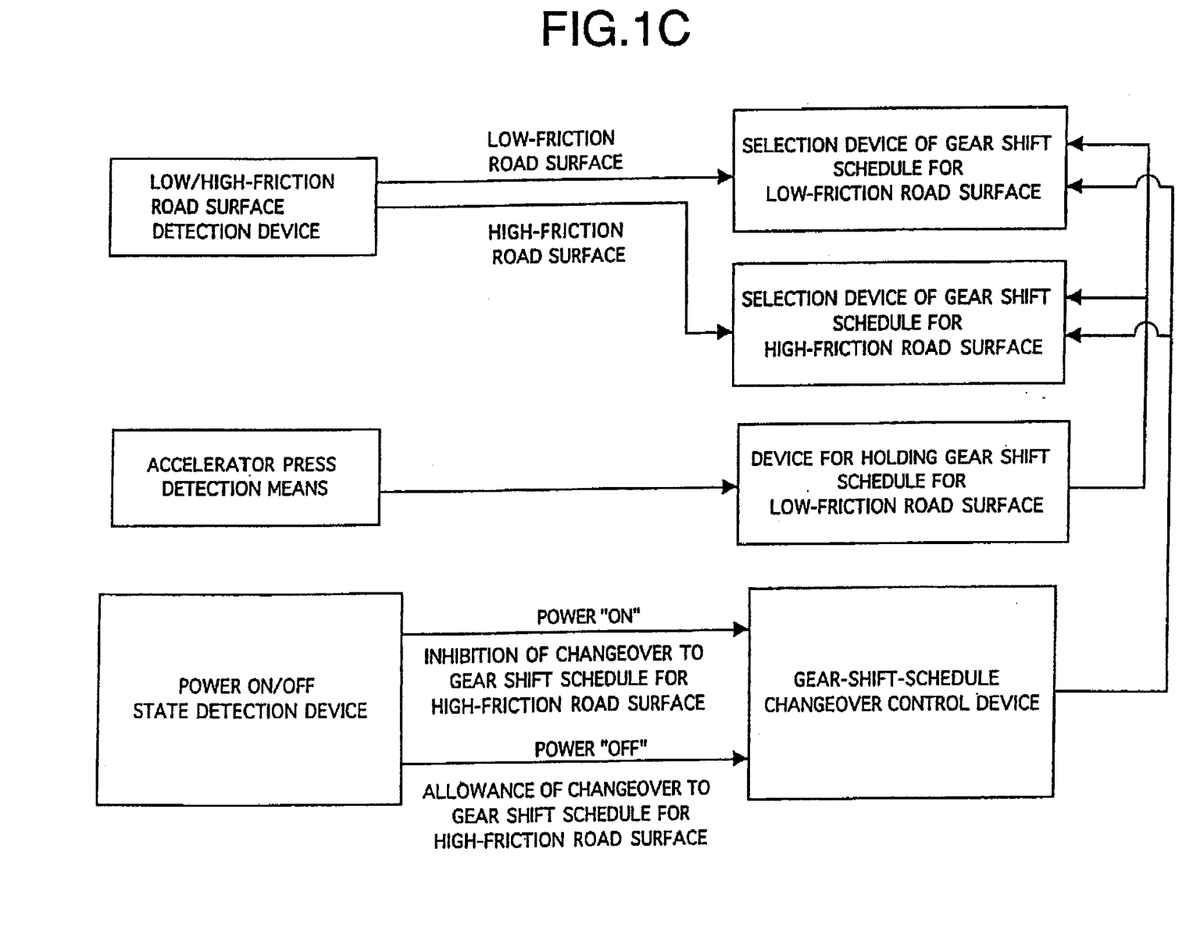
Figure 2:
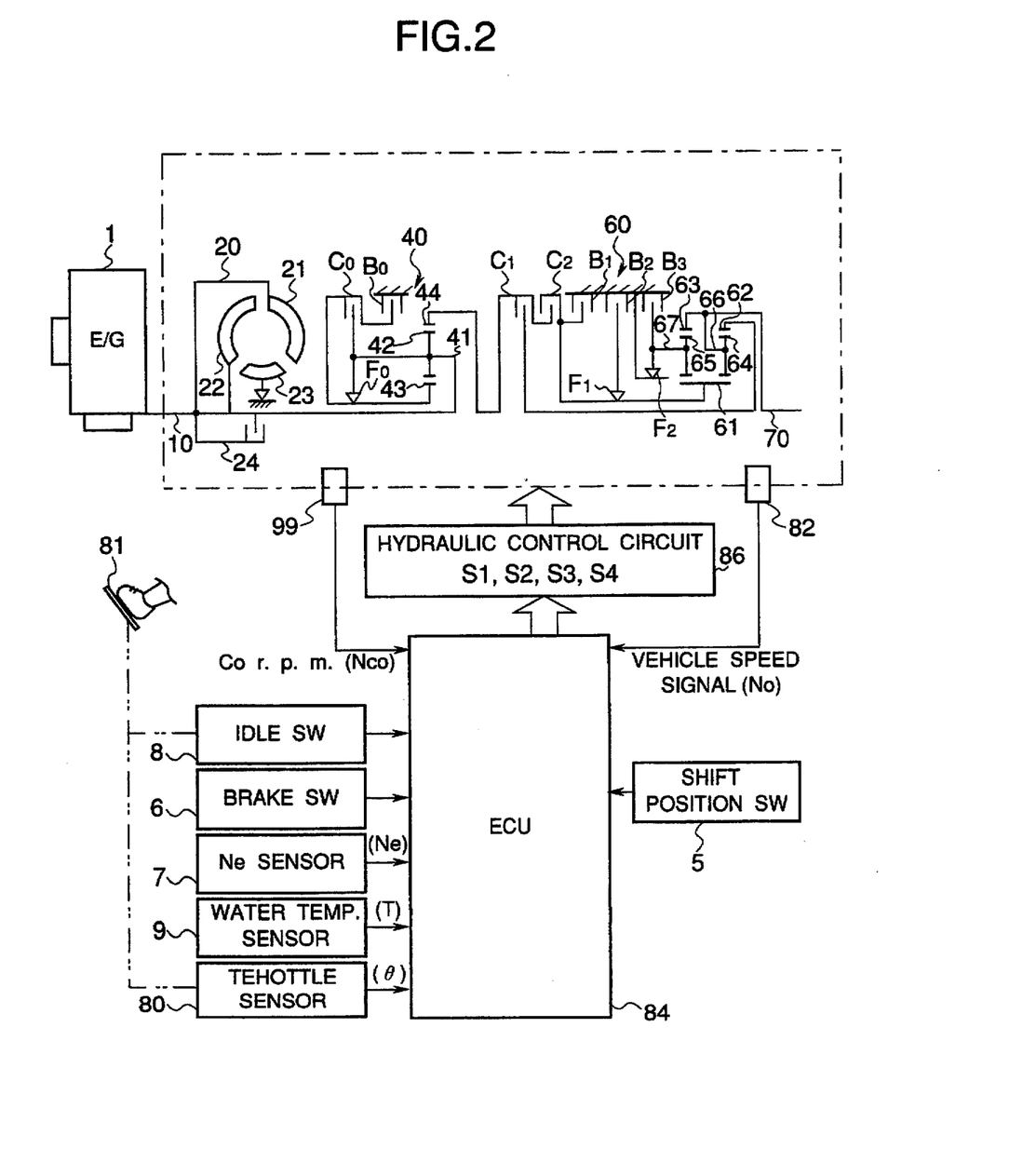
FIG. 2 is a general diagram of an automatic transmission to which the present invention is applied.

FIG. 2 is a general diagram of an automatic transmission which is combined with an electronic fuel injection engine for an automobile, and to which the present invention is applied.

The automatic transmission has a torque converter portion 20, an overdrive mechanism portion 40, and an underdrive mechanism portion 60 furnished with three forward gears and one reverse gear.

The torque converter portion 20 is a well-known one including a pump 21, a turbine 22, a stator 23 and a lockup clutch 24. The torque convertor portion 20 transmits the output of the crankshaft 10 of the engine 1 to the overdrive mechanism portion 40.

The overdrive mechanism portion 40 includes one set of planetary gears which consist of a sun gear 43, a ring gear 44, a planetary pinion 42 and a carrier 41. The rotational state of the planetary gears is controlled by a clutch C0, a brake B0 and a one-way clutch F0.

The underdrive mechanism portion 60 includes two sets of planetary gears which consist of a common sun gear 61, ring gears 62, 63, planetary pinions 64, 65 and carriers 66, 67. The rotational states of the two sets of planetary gears, and the connectional states thereof with the overdrive mechanism portion 40 are controlled by clutches C1, C2, brakes B1~B3 and one-way clutches F1, F2.

A computer 84 for controlling the automatic transmission is supplied with signals for various controls from sensors and switches. More specifically, the computer 84 is supplied with signals from: a throttle sensor 80 which detects the opening degree (θ) of a throttle valve for reflecting the load of the engine 1; a sensor for the r.p.m. (revolutions per minute) of the output shaft 70 of the automatic transmission, as a vehicle speed sensor 82 which detects the vehicle speed (No) of the automobile; a sensor 99 which detects the r.p.m. (NC0) of the clutch C0; a shift position switch 5 which delivers a shift position signal; a brake switch 6 which produces a signal while a foot brake pedal is stepped on; an Ne sensor 7 which detects the r.p.m. (Ne) of the engine 1; an idle switch 8 which produces a state signal of an idle contact ("OFF" when the accelerator pedal 81 of the automobile is pressed or stepped on, and "ON" when it is released or eased up); a water temperature sensor 9 which detects the temperature (T) of the cooling water of the engine 1.

In this embodiment, the information (No) of the vehicle speed sensor 82 is also used for evaluating the angular acceleration of the output shaft 70 (which corresponds to a calculated vehicle acceleration).

Further, the idle switch 8 is used not only for detecting a press of the acceleration pedal 81, but also for detecting either of power ON state and a power OFF state.

Figure 5A:
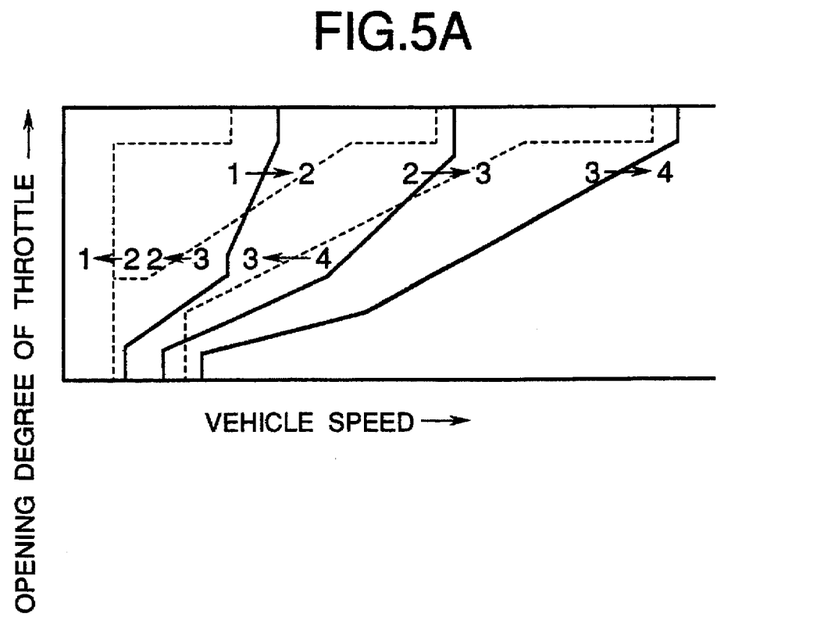
FIGS. 5A and 5B are diagrams each showing gear shift schedule in the embodiment.
Figure 5B:
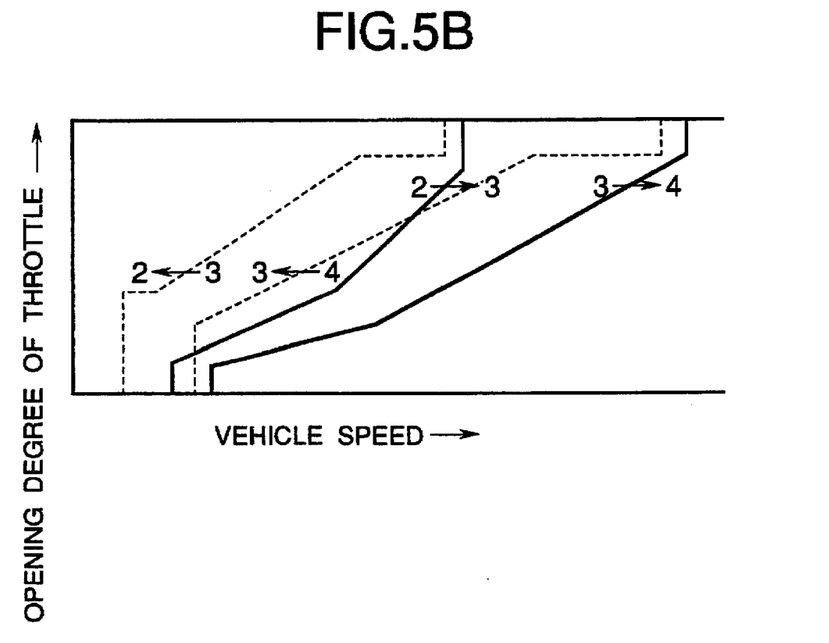

Using the input signals from the sensors and the switches as parameters, the computer 84 drives and controls solenoid valves S1, S2, S3 and S4 included in a hydraulic control circuit 86, in conformity with one of preset shift-point maps (one of gear shift schedule) shown in FIGS. 5A and 5B consisted of the throttle opening degree (θ) and the vehicle speed (No). Thus, the gear shifting of the automatic transmission is controlled according to the combinations of the engagements of the clutches, brakes etc. as tabulated in FIG. 3.

Figure 3:
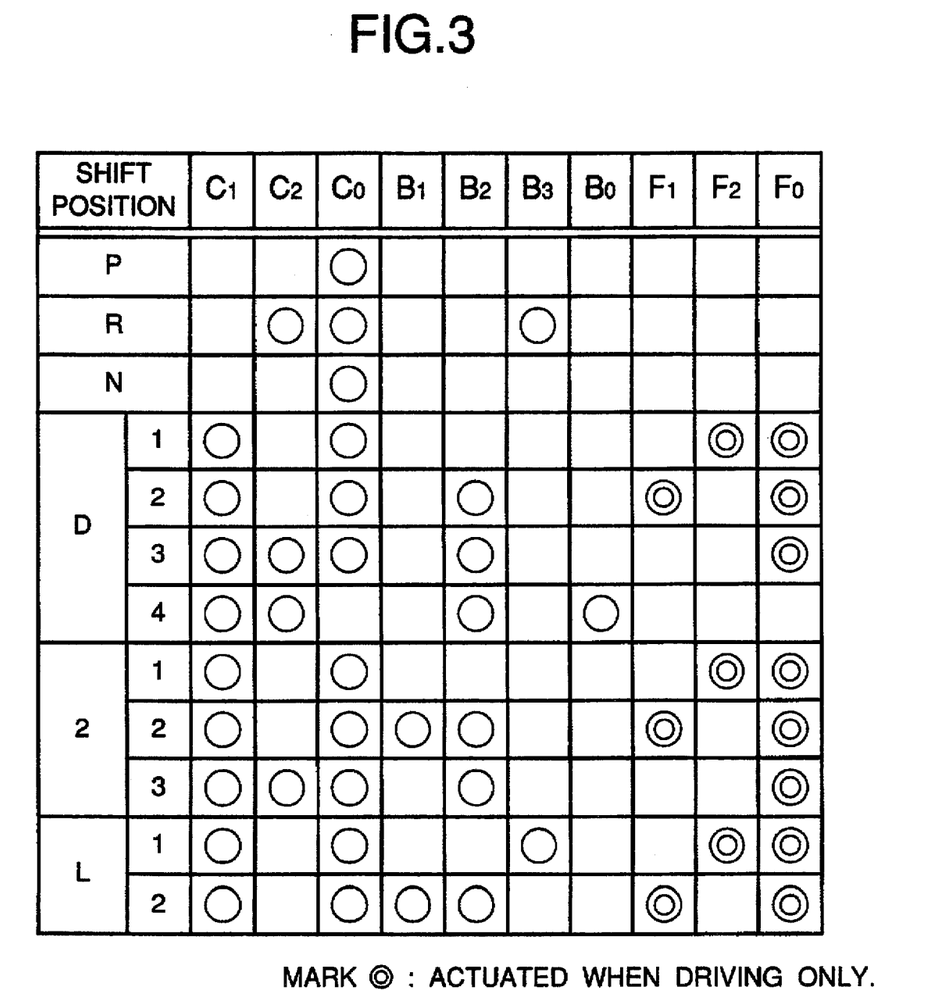
FIG. 3 is a table showing the engagement states of clutches, brakes etc. of the automatic transmission depicted in FIG. 2.

In the table of FIG. 3, letters P, R and N denote parking, reverse and neutral positions, respectively. A drive position "D" includes the first gear (lowest-speed gear stage) through the fourth gear (overdrive gear stage). A second gear position "2" includes the first gear, the second gear in which engine brake is available, and the third gear from which a downshift is allowable, and to which an upshift is not allowable. A low gear position "L" includes the first gear in which engine brake is available, and the second gear from which a downshift is allowable, and to which an upshift is not allowable.

Figure 4:
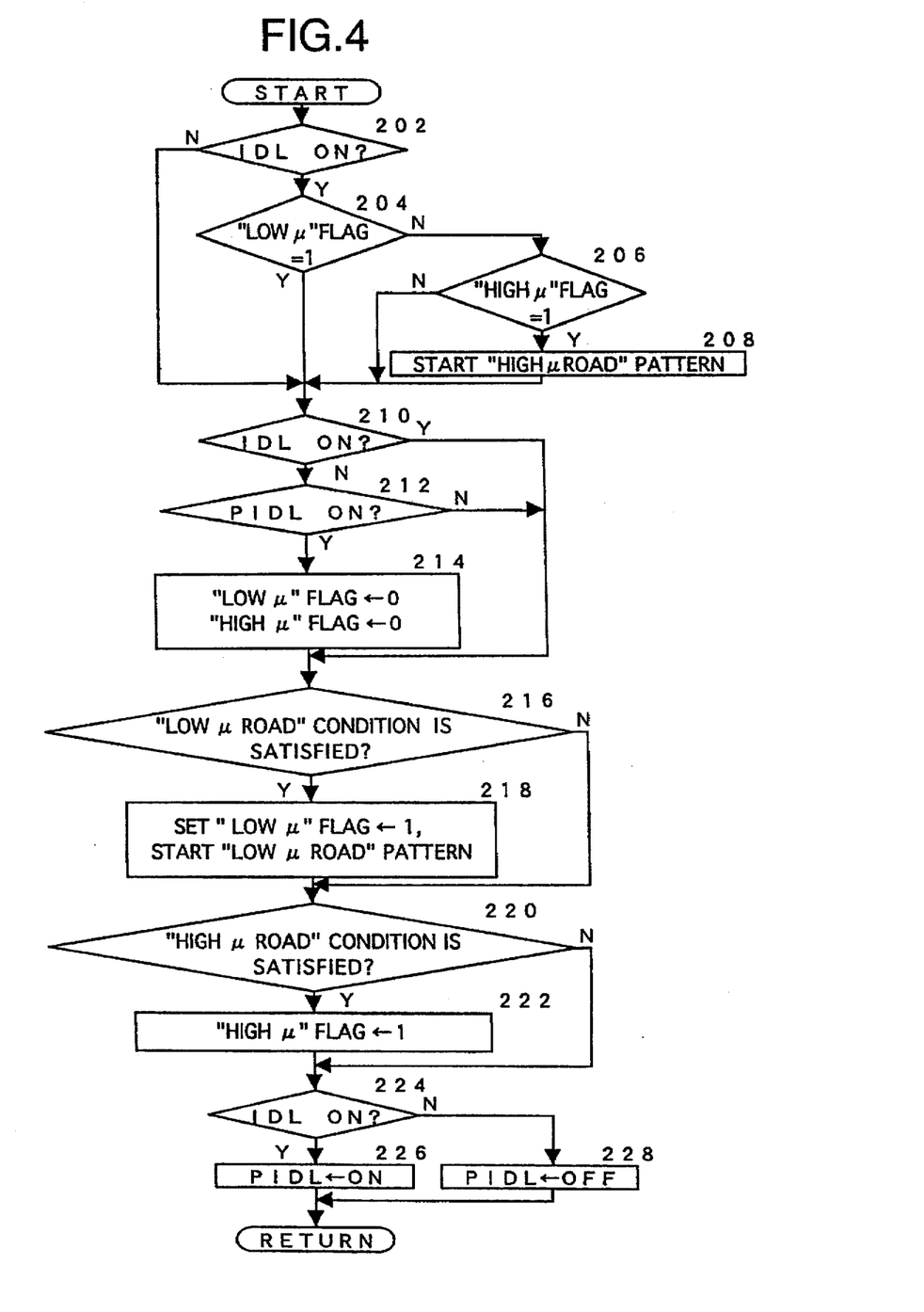
FIG. 4 is a flow chart showing a control in an embodiment of the present invention.

Besides, the computer 84 controls gear shift schedule for a low-friction road surface and gear shift schedule for a high-friction road surface in accordance with a road surface condition, as shown in FIG. 4.

Then the control flow shown in FIG. 4 will be explained.

Upon the start of the control flow, whether or not the idle contact is ON is detected at a step 202. Subject to the idle contact ON, whether or not a "low-μ" (low-friction) flag is 1 (one) is detected at the next step 204. The low-μ flag is a flag which is set to 1 when a "low-μ road" condition has been satisfied (that is, when the running road surface has been detected as the low-friction road surface). The low-μ flag, however, is not always cleared to 0 (zero) by reason that the low-μ road condition has not been satisfied. In the case of this embodiment, the gear shift schedule for the low-friction road surface is selected whenever the low-μ flag is 1.

In both the cases where, in the above detections, the idle contact is not ON and the low-μ flag is 1, the control flow proceeds to a step 210.

In addition, when the low-μ flag is not 1, whether or not a "high-μ" (high-friction) flag is 1 (one) is detected at a step 206. The high-μ flag is a flag which is set to 1 when a "high-μ road" condition has been satisfied (that is, when the running road surface has been detected as the high-friction road surface). The high-μ flag, however, is not always cleared to 0 (zero) by reason that the high-μ road condition has not been satisfied. Further, in the case of this embodiment, the gear shift schedule for the high-friction road surface is not always selected even if the high-μ flag is 1.

In a case where the low-μ flag is 0 and the high-μ flag is 1, the start of the motor vehicle with the first gear (at the lowest-speed gear stage) and the gear shift schedule for the high-friction road surface as shown in FIG. 5A is selected at a step 208. Thus, a "high-μ road" pattern is started.

On the other hand, when the high-μ flag is not 1, the control flow proceeds to the step 210.

At the step 210, whether or not the idle contact is ON is detected again. Subject to the idle contact OFF, whether or not the idle contact was ON in the preceding cycle of the control flow is detected at the next step 212. If the idle contact was ON in the preceding cycle, then it means that the power ON state of the motor vehicle has changed to the power OFF state thereof, in other words, that the accelerator pedal 81 has been pressed in the current cycle of the control flow. At the next step 214, therefore, both the low-μ flag and the high-μ flag are cleared to 0. This process is based on the fact that, because the accelerator pedal 81 is pressed, whether the running road surface is the low-friction one or the high-friction one, can be actually detected.

By the way, in both the cases where the idle contact is ON in the current cycle and it was OFF in the preceding cycle, the control flow proceeds to a step 216 with the step 214 skipped.

At the step 216, it is detected whether or not the motor vehicle is running on a low-μ road, that is, whether or not the running road surface is the low-friction one. Any known method can be used to detect the low-μ road, for example, a method which checks if an actual acceleration calculated from a wheel speed is higher than a reference acceleration calculated from engine r.p.m., by a predetermined value or more.

Upon the detection of the low-friction road surface, at the next step 218, the low-μ flag is immediately set to 1, and the start of the motor vehicle with the second gear (at the second-speed gear stage) and the gear shift schedule for the low-friction road surface as shown in FIG. 5B is selected. Thus, a "low-μ road" pattern is started.

On the other hand, when the low-friction road surface has not been detected at the step 216, this control flow proceeds to a step 220 with the step 218 skipped. Here, the low-μ flag is not immediately cleared to 0 by reason that the running road surface is not the low-friction one. Thus, the gear shift schedule for the low-friction road surface is held until the accelerator pedal 81 is pressed next.

At the step 220, it is detected whether or not the running road surface is the high-friction one, that is, whether or not the motor vehicle is running on a high-μ road. Any known method can be used to detect the high-μ road, for example, a method which checks whether or not the condition is satisfied that a throttle opening degree is larger than a preset value, and besides, a vehicle acceleration calculated from the r.p.m. of a rotating member included in a power transmission path does not exceed a predetermined value, that is, the method which checks whether or not the motor vehicle undergoes no slip though the accelerator pedal 81 is pressed deep.

When the high-friction road surface has been detected, the high-μ flag is set to 1 at the next step 222, thereafter the control flow proceeds to step 224. On the other hand, when the high-friction road surface has not been detected, the control flow directly proceeds to the step 224 with the step 222 skipped.

At the step 224, whether or not the idle contact is ON, is detected. Subject to the idle contact ON, a flag PIDL indicative of the idle state in the preceding cycle is turned ON at a step 226, whereupon the control flow is returned to the step 202. On the other hand, subject to the idle contact OFF, the flag PIDL is turned OFF at a step 228, whereupon the control flow is returned.

After the return, as stated above, both the low-μ flag and the high-μ flag are cleared at the step 214 when the press of the accelerator pedal 81 has been detected at the steps 210 and 212. Further, the road surface condition is detected again at the steps 216 and 220, and the gear shift schedule corresponding to the road surface condition is selected on the basis of the newly detected result.

Besides, in a case where both the low-μ road condition and the high-μ road condition are satisfied before the timing of the alteration of a shift schedule, the control flow does not proceed to the steps 206 and 208 unless the low-μ flag is 0 in the detection of the step 204. That is, the low-μ road detection has priority over the high-μ road detection.

To the contrary, in a case where neither the low-μ road condition nor the high-μ road condition is satisfied in a time period from the preceding press of the accelerator pedal 81 to the current press thereof, the detected result, or the shift schedule, or the starting gear stage before the preceding press is continuously used.

As stated above, the result of the satisfaction of the low-μ road condition or the high-μ road condition is held till the next press of the accelerator pedal. Moreover, the changeover from the gear shift those for the high-friction road surface is effected only in a case where the low-friction road surface has not been detected at the step 216, the high-friction road surface has been detected at the step 220, and besides the idle contact ON has been detected at the step 202 after the return.

In this manner, the changeover of the gear shift schedule from those for the low-friction road surface to those for the high-friction road surface is permitted only in the idle-ON state. Therefore, a (second gear→first gear) downshift due to the changeover of the gear shift schedule can be prevented from occurring in the pressed state of the accelerator pedal 81, and the appearance of an unexpected shift shock can be avoided.

Moreover, once the gear shift schedule for the low-friction road surface have been selected, they are held till the next press of the accelerator pedal 81. Therefore, even in a case where the low-friction road surface is not (cannot be) detected due to, for example, the driver's operation of releasing the accelerator pedal 81, the motor vehicle can be reliably started at the high-speed gear stage (with the second gear).

Furthermore, after the accelerator pedal 81 has been pressed next, the gear shift schedule is selected on the basis of the newly detected result. Therefore, the gear shift schedule can be appropriately changed-over in correspondence with the change of the road surface situation.

As thus described, this embodiment realizes the appropriate changeover of gear shift schedule corresponding to a road surface condition and an accelerator pedal operation. This brings forth the effect that a downshift from the second gear to the first gear due to the changeover of the gear shift schedule in the pressed state of an accelerator pedal 81 can be prevented from occurring, so an unexpected shift shock can be avoided, and the effect that a motor vehicle can be surely started at the high-speed gear stage (with the second gear) as long as a low-friction road surface continues.

What is claimed is:

1. A gear-shift control system of an automatic transmission for a motor vehicle having means for detecting whether a road on which said vehicle is running has a low-friction road surface or a high-friction road surface, wherein gear shift schedule for the low-friction road surface adapted to start said motor vehicle at a high-speed gear stage is selected when the low-friction road surface is detected, whereas gear shift schedule for the high-friction road surface adapted to start said motor vehicle at a low-speed gear stage is selected when the high-friction road surface is detected, and wherein a gear shift is controlled in conformity with the selected gear-shift schedule, comprising:

means for detecting a press of an accelerator pedal; and     means for holding the gear shift schedule for said low-friction road surface until a next press of the accelerator pedal is detected, if said gear shift schedule for said low-friction road surface is once selected according to said detected result of the road surface.

* * * * *